(12) United States Patent
Dexel

(10) Patent No.: US 6,749,094 B1
(45) Date of Patent: Jun. 15, 2004

(54) LUG WRENCH AND SPARE TIRE LOCKING ASSEMBLY

(76) Inventor: Dennis D. Dexel, 20638 Hwy. 140, Herperus, CO (US) 81326

( * ) Notice: Subject to any disclaimer, the term of this patent is extended or adjusted under 35 U.S.C. 154(b) by 182 days.

(21) Appl. No.: 10/166,559

(22) Filed: Jun. 12, 2002

(51) Int. Cl.⁷ .................................. B60R 7/00
(52) U.S. Cl. ........................ 224/42.24; 224/42.25; 224/42.26; 224/42.3; 70/259
(58) Field of Search ................ 224/42.12, 42.14, 224/42.24, 42.25, 42.26, 42.3, 558; 70/258, 259

(56) References Cited

U.S. PATENT DOCUMENTS

| | | | | |
|---|---|---|---|---|
| 2,711,271 A | * | 6/1955 | Stephens | 224/42.24 |
| 2,831,622 A | * | 4/1958 | Bacca | 224/42.24 |
| 3,613,972 A | * | 10/1971 | Daughhetee | 224/42.24 |
| 3,688,954 A | * | 9/1972 | Owen | 224/42.24 |
| 3,843,033 A | * | 10/1974 | Wirth, Sr. | 224/42.24 |
| 3,865,291 A | * | 2/1975 | Tidwell | 224/42.24 |
| 4,007,863 A | * | 2/1977 | Norris | 224/403 |
| 4,225,066 A | * | 9/1980 | Barr | 224/42.24 |
| 4,294,088 A | * | 10/1981 | Barr | 70/56 |
| 4,598,848 A | * | 7/1986 | Clark | 224/42.24 |
| 4,738,382 A | * | 4/1988 | Natori | 224/42.24 |
| 4,751,833 A | * | 6/1988 | Stumpf, Jr. | 70/259 |
| 4,873,851 A | * | 10/1989 | Arnett | 70/259 |
| 5,303,569 A | * | 4/1994 | Wright | 70/259 |
| 5,427,287 A | * | 6/1995 | Harrison | 224/42.21 |
| 5,586,698 A | * | 12/1996 | Satoh | 224/42.24 |
| 6,116,483 A | * | 9/2000 | MacKarvich | 224/42.24 |
| 6,213,361 B1 | * | 4/2001 | Dexel | 224/42.24 |
| 6,370,927 B1 | * | 4/2002 | Gonzalez et al. | 70/259 |
| 6,427,885 B1 | * | 8/2002 | Dexel | 224/42.24 |

* cited by examiner

Primary Examiner—Stephen K. Cronin
(74) Attorney, Agent, or Firm—Albert O. Cota

(57) ABSTRACT

A lug wrench and spare tire locking assembly that is attached to a motor vehicle or trailer which includes a hollow wrench carrier body (20) having four open-ended slots (22) at right angles to each other that are configured to interface with a four-way lug-wrench (56). The body has a pair of opposed short legs (24) formed between two adjacent slots, and another pair of opposed long legs (26) formed between each remaining slot. The body also includes a shackle lock pin (28) that extends beyond the legs. A slotted flange (38) is joined to a vehicle bracket (44) and threaded shaft (36) connects the body to the flange. A spare wheel is fastened to the vehicle bracket on top of the flange and a four-way lug-wrench (56) is placed over the wheel interfacing with the slots in the body. A locking plate (58), that has a shackle-less padlock permanently attached thereon, is positioned over the shackle lock pin and the pin penetrates into the padlock while the short legs of the carrier body engage the underside of the locking plate and the long legs penetrate the plate, providing attachment of both the lug-wrench and spare tire and wheel to a vehicle.

15 Claims, 4 Drawing Sheets

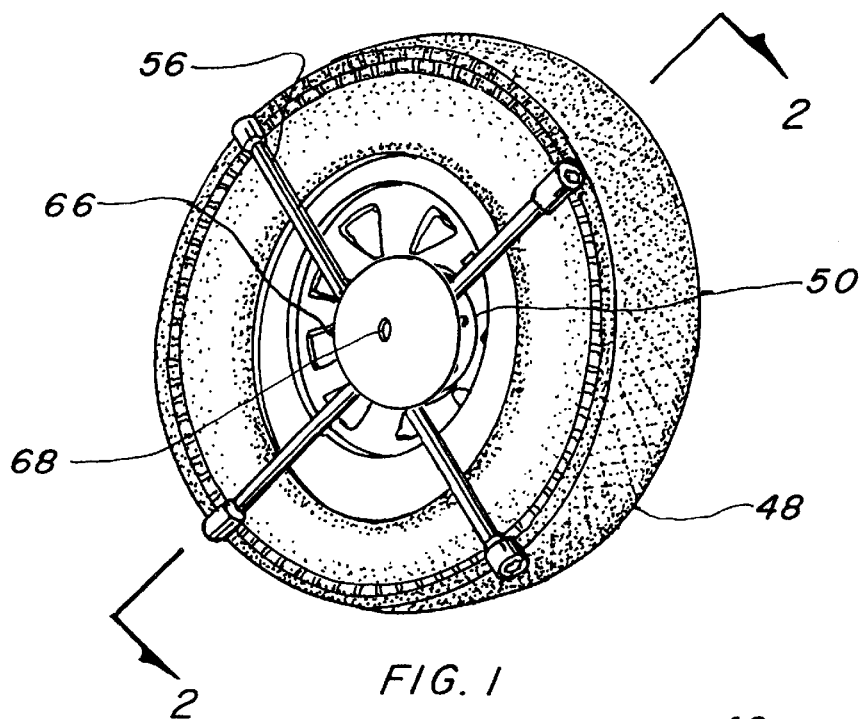
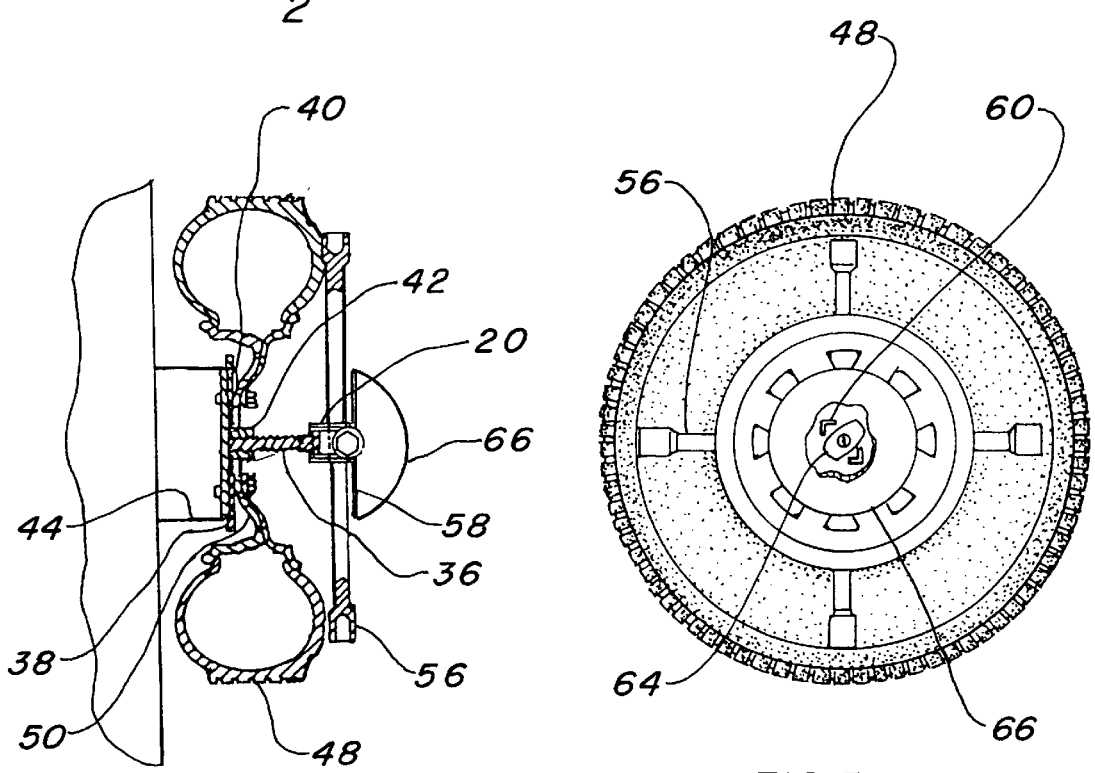
FIG. 1
FIG. 2
FIG. 3

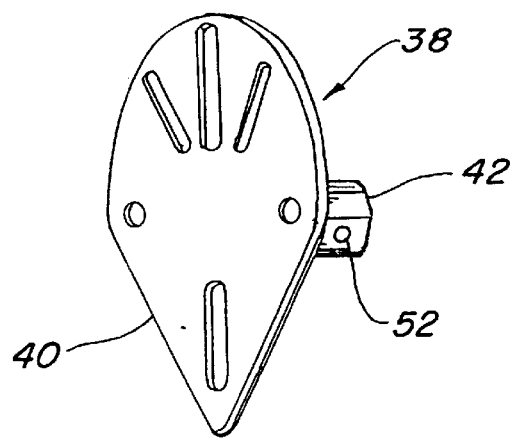
FIG. 6
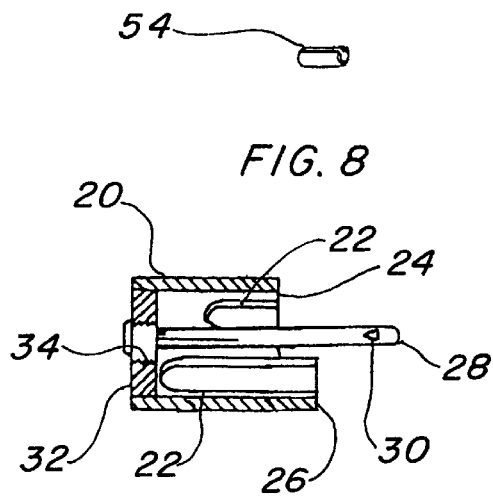
FIG. 7
FIG. 8
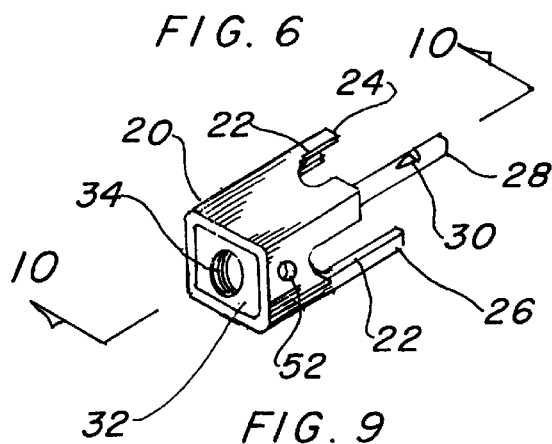
FIG. 9
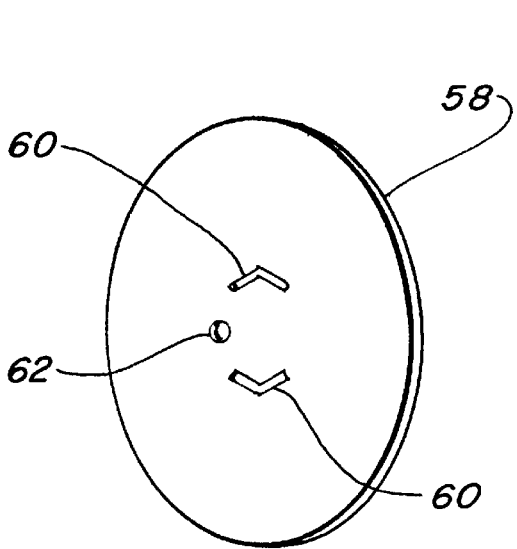
FIG. 11
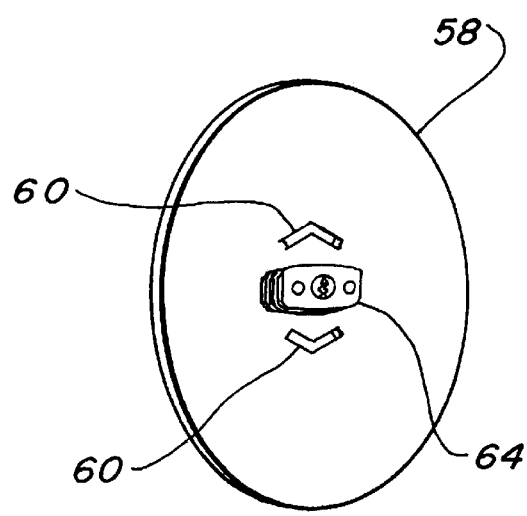
FIG. 10
FIG. 12

LUG WRENCH AND SPARE TIRE LOCKING ASSEMBLY

TECHNICAL FIELD

The present invention relates to lug wrench carriers in general. More specifically, to a carrier that locks a four-way lug-wrench onto a spare tire that is located on a vehicle or trailer to prevent theft of both the vehicle spare tire and the lug wrench.

BACKGROUND ART

Previously, many types of wheel carrier brackets have been used to provide an effective means of securing a spare tire to a vehicle or trailer. In the past, elaborate brackets have been developed that attach a spare tire and wheel directly to the bed of a pickup truck or to a sidewall of a vehicle. Lug wrenches were usually stored in a separate location in the vehicle or trailer, as an accessory which is typically rather simple in construction when furnished by the original equipment manufacturer. A four-way lug-wrench has much greater utility, furthermore the combination of a wrench and a carrier has not been used in the past by the known prior art, other than my own patent that will issue shortly, for preventing theft of both a wrench and a spare tire and wheel.

A search of the prior art did not disclose any patents that are similar to the claims of the instant invention, however the following U.S. patents are considered related:

| U.S. Pat. No. | Inventor | Issue Date |
| --- | --- | --- |
| 4,007,863 | Norris | Aug 5, 1975 |
| 3,865,291 | Tidwell | Feb 11, 1975 |
| 3,843,033 | Wirth | Oct 22, 1974 |
| 3,688,954 | Neal | Sep 11, 1972 |
| 3,613,972 | Daughhetee | Oct 19, 1971 |

Other references

| U.S. Pat. Application | Filing Date | First Named Inventor |
| --- | --- | --- |
| 09/552,548 | 04/10/2000 | Dennis D. Dexel |

My application Ser. No. 09/552,548 is presently in the issue phase, and is for my original invention which is the basis to which this improvement is directed. The patent application is entitled: Locking Four Way Lug Wrench Carrier, which discloses most of the same elements, however my improvement simplifies the basic novelty of the invention by eliminating the emblem, plate, retainer and locking cover. The padlock is now located on the outside of a locking plate held in place with a set of legs penetrating therethrough and covered with a baby-moon hub cap, which is a major saving in manufacturing costs and improves the overall appearance.

Norris in U.S. Pat. No. 4,007,863 teaches an upright, vertically-extendible frame that includes depending feet that rest upon the flooring of a pickup truck bed with an upper projecting abutment that engages the side wall of a pickup truck bed. A frame includes a clamp that engages the vehicle wheel and tire assembly against one side of the frame.

U.S. Pat. No. 3,865,291 issued to Tidwell is for a spare tire holder that includes an elongated spine provided with clamps for clamping its upper end to the top of a pickup truck bedside wall. The adjustable parts of the clamps are so located as to not interfere with the mounting of a camper in the bed of a pickup truck. Wheel securing arrangements fastened several sizes of truck wheels to the spines of the holder.

U.S. Pat. No. 3,843,033 of Wirth discloses a tire and wheel carrier mounted in a rack for a pickup truck. The carrier has a base that is mounted to the floor of the truck and includes a pair of spaced upright rods that are secured to a base element, thus making it vertically adjustable relative to the base element. A top element is secured to the rods and also the overhanging flange of the truck bed. A holding unit secures the wheel and tire assembly to the rods in a protected and rigid manner.

Daughhetee in U.S. Pat. No. 3,613,972 teaches a spare tire bracket that is mounted on the rear end of a pickup truck or the trunk of an automobile. A support assembly is secured to the vehicle by an anchor and the invention includes a tire connector, which is mountable to the wheel of a spare tire. The tire connector includes a yoke with a threaded member connected to a lock clamp that is removable when not in use.

For background purposes and as indicative of the art to which the invention is related reference may be made to U.S. Pat. No. 3,688,954 issued to Neal on Sept. 11, 1972.

DISCLOSURE OF THE INVENTION

In common usage, today's spare tires are normally stored in wheel wells in the trunk of an automobile and are protected by being inside the trunk, which has a locked deck lid. Recently, the popularity of pick up trucks, four-wheel-drive sports utility vehicles and vans have created a different problem in that the spare tire is often stored on the outside of the vehicle and as such is subject to theft if not protected by a lock. Further, most lug-wrenches provided by the original equipment manufacturers are rather simple and not particularly convenient to use. Four-way lug-wrenches have been in use, for decades and are fast to use with a length that is easy to use and robust in construction. My previous patent application along with this improvement solves the problem by combining storage and spare wheel protection by the retention of a four-way lug wrench located on top of the wheel. This is accomplished by the use of a locked device that is attached to the spare tire and wheel bracket or directly to the vehicle, and uses the lug wrench as a barrier, thus preventing removal of the wheel and lug-wrench unless unlocked.

The primary object of the improvement to the invention is the simplicity that is afforded by eliminating some of the rather complex and labor intensive components and by creating a unique method of attaching the lock, which is easy to accomplish. As previously mentioned, the improvement eliminates some of the components and replaces them with simplified elements that are easier to manufacture and create a more pleasing appearance. The original emblem plate, retainer and locking cover are replaced with a simple flat locking plate that covers most of the lug-wrench and is held in place by a set of longer legs on the wrench carrier body that penetrate apertures in the plate. The shackle also penetrates the carrier body, and a padlock attached permanently to the plate receives the shackle and locks it into place securely. An optional baby moon hub cap covers the outside surface of the plate for aesthetic reasons, all of which create a major saving in manufacturing costs and improves the overall appearance.

An important object of the invention along with this improvement is realized since the exterior tire brackets have become more popular and the demand for such theft protection is obviously needed in the United States. Furthermore, the entire market of trailers for boats, horses, and utility hauling have been with us for as long as internal combustion vehicles have been in use and have had the same problems with external mounting of spare tire and wheel assemblies. The instant invention fills this long felt need by accomplishing the task of providing a convenient yet out of the way and secure place to store the lug-wrench and provide anti-theft protection at the same time. Four-way lug-wrenches by themselves are not so expensive that they need to be specifically locked up however, when one is required their usage is urgent, which increases the invention's utility.

Another object of the improved invention is that its usage is almost universal as it will function with any wheel that has a standard bolt pattern since the locking mechanism is first attached to the vehicle spare tire bracket studs using a thin push nut to hold it in place. The actual tire size is of little importance as the wrench carrier is adjustable for tire width. This adjustability is important as tire sizes and rim diameters vary considerably in the industry and utility of the vehicle.

Still another object of the improved invention is that almost any four-way lug-wrench may be used with no modification required. In this country, so-called ⅝ inch diameter wrenches have sockets, to fit ¹¹⁄₁₆, ¾, ¹³⁄₁₆ and ⅞ sockets while the ¾-inch diameter wrenches historically fit ⅞, ¹⁵⁄₁₆, 1 and 1¹⁄₁₆. Metric sizes are also commonly available in the 17 to 22 mm sizes, all of which function properly with the invention. Obviously the wrench shaft size must be considered, but the carrier itself varies only slightly in size and the width of the open-ended slots formed into the invention that receive the wrench.

Yet another object of the improved invention is its adaptability to fit most vehicle spare tire brackets. Since the original equipment manufacturers fabricate a bracket to fit the wheel rim and most wheels in the industry are similar in construction, no modification is required for the use of the invention as it is only necessary to install a slotted flange that is provided between the bracket and the wheel hub. The flange is slotted to include a pattern that will fit all vehicles using conventional bolt circles in their wheels.

A further object is disclosed that if only the four-way lug-wrench is to be stored and locked in place without the spare tire and rim, the invention may be mounted directly to a vehicle bulkhead or trailer wall by using a similar pre-drilled bulkhead mounting plate having no slots but a centered short threaded stud to accommodate the invention. The plate can be secured with conventional nuts and bolts or self-tapping screws.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment mounted on a vehicle wheel carrier with the four-way lug-wrench securing a spare tire and wheel in place.

FIG. 2 is a cross sectional view taken along lines 2—2 of FIG. 1.

FIG. 3 is a front elevation view of the invention in the preferred embodiment illustrated as a rear-mounted wheel and tire on a vehicle.

FIG. 6 is a partial isometric view of the slotted flange assembly, completely removed from the invention for clarity.

FIG. 7 is a partial isometric view of the grooved round threaded shaft, completely removed from the invention for clarity.

FIG. 8 is a partial isometric view of one of the tension pins, completely removed from the invention for clarity.

FIG. 9 is a partial isometric view of the wrench carrier body, completely removed from the invention for clarity.

FIG. 10 is a cross-sectional view taken along lines 10—10 of FIG. 9 illustrating the shackle lock pin attached inside the hollow of the wrench carrier body.

FIG. 11 is a rear view of the locking plate, completely removed from the invention for clarity.

FIG. 12 is a front view of the locking plate illustrating the padlock welded to the plate with the entire assembly removed from the invention for clarity.

BEST MODE FOR CARRYING OUT THE INVENTION

The best mode for carrying out the lug wrench and spare tire locking assembly is presented in terms of a preferred embodiment. The preferred embodiment, as shown in FIGS. 1 through 13, is comprised of a hollow wrench carrier body 20 that includes four open-ended slots 22 at right angles to each other in the walls of the body in pairs configured to interface and match the offset of a conventional four-way lug-wrench. The body 20 is preferably rectangular in shape and formed of metal such as found in a steel square tube.

Figure 5:
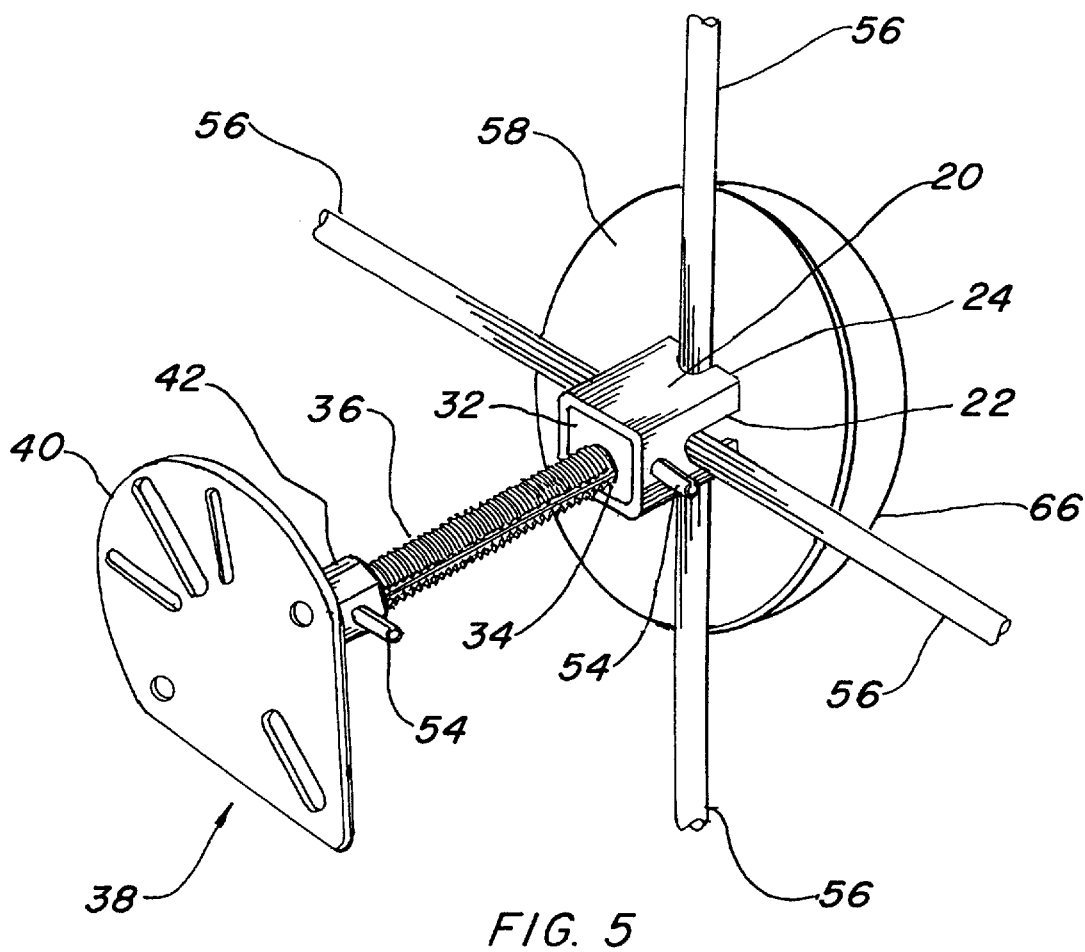
FIG. 5 is a partial isometric view of the preferred embodiment of the invention less the lug-wrench, completely removed from the invention for clarity.

The body 20 includes a first pair of opposed short legs 24 that are formed between two adjacent open-ended slots 22, and a second pair of opposed long legs 26 that are formed between the remaining opposed open-ended slots 22. Both of the short legs 24 have the same extended length, and the long legs 26 are both equal in length as shown in FIGS. 5, 9 and 10. The legs 24 and 26 are formed in an angular shape from the corners of the square steel tubing and as such retain much of their structural integrity.

A single separate shackle lock pin 28 is positioned within the hollow of the body 20 at one of the short leg 24 corners and extends outwardly therefrom. The lock pin 28 as illustrated best in FIGS. 5, 9 and 10, is round and includes a notch 30 to be mated with a shackle-less padlock. The lock pin 28 is permanently attached to the body 20 with pins or welded as illustrated, and preferably includes a head on one end, with the other end beveled for convenience when introducing the pin into a padlock.

Figure 4:
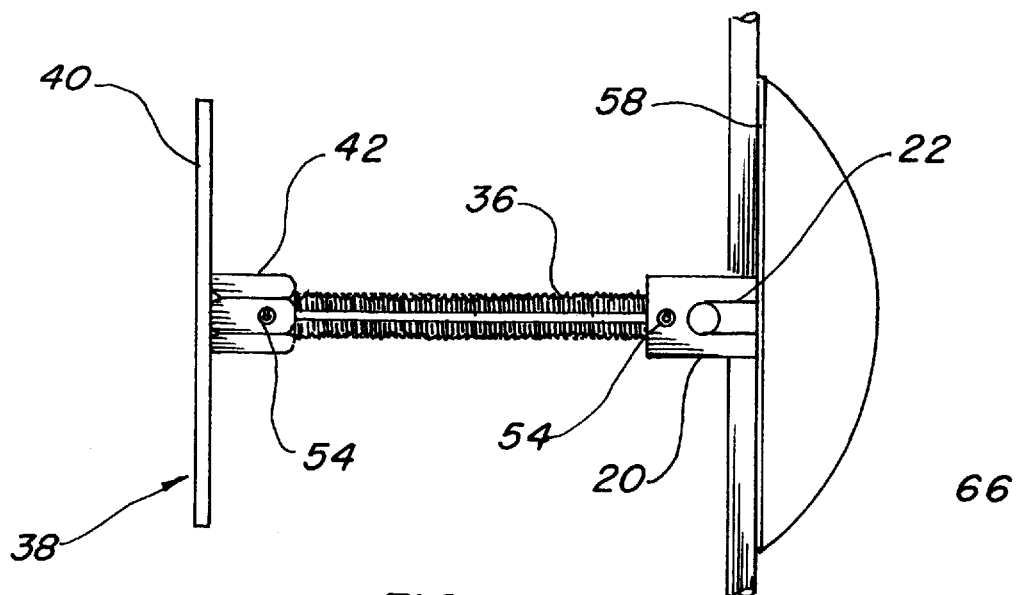
FIG. 4 is a side elevation view of the preferred embodiment of the invention less the lug-wrench, completely removed from a vehicle.

The body 20 is enclosed on one end utilizing a bottom 32, as shown in FIGS. 5, 9 and 10, that is either welded in place, pinned or punch indented. The bottom 32 has a threaded bore 34 parallel to the shackle pin 28 in which a grooved round, threaded shaft 36 is connected, as illustrated best in FIGS. 4 and 5. The threaded shaft 36 is a conventional piece of steel running thread with a key-way like longitudinal groove machined lengthwise through the threads. The purpose of the groove in the shaft 36 is to lock the shaft in place when the invention is adjusted relative to a tire width and depth. The actual length of the shaft 36 may therefore vary with the particular type of vehicle to which the carrier is attached. It has been found that two lengths will cover almost all conventional vehicles, with 3 inches (7.62 cm) standard and a 4½ inch (11.43 cm) optional. The standard length is illustrated in FIGS. 2, 4 and 5, and the optional length is illustrated in phantom in the exploded view of FIG. 13.

A slotted flange 38, consisting of a flat metallic plate 40 with a female-threaded boss 42, is utilized to provide attachment to the motor vehicle or trailer. The boss 42 may be welded or machined in the center of the flat portion of the plate 40. Further, the threaded boss 42 may be any shape on the outside as an example hexagonal is shown in FIGS. 5 and 6, also round is another choice with square or any other exterior shape functioning with equal ease. The slotted flange flat plate's 40 preferred configuration is half-formed in a semi-circular shape, and the other half having an angular shape with the female threaded boss 42 essentially located in the middle or essentially halfway in between. The slotted flange 38 illustrated in FIGS. 2, 4, 5, 6 and 13 includes a plurality of slots that are configured to mate with a vehicle or trailer spare tire bracket, as shown best in FIG. 2.

Figure 13:
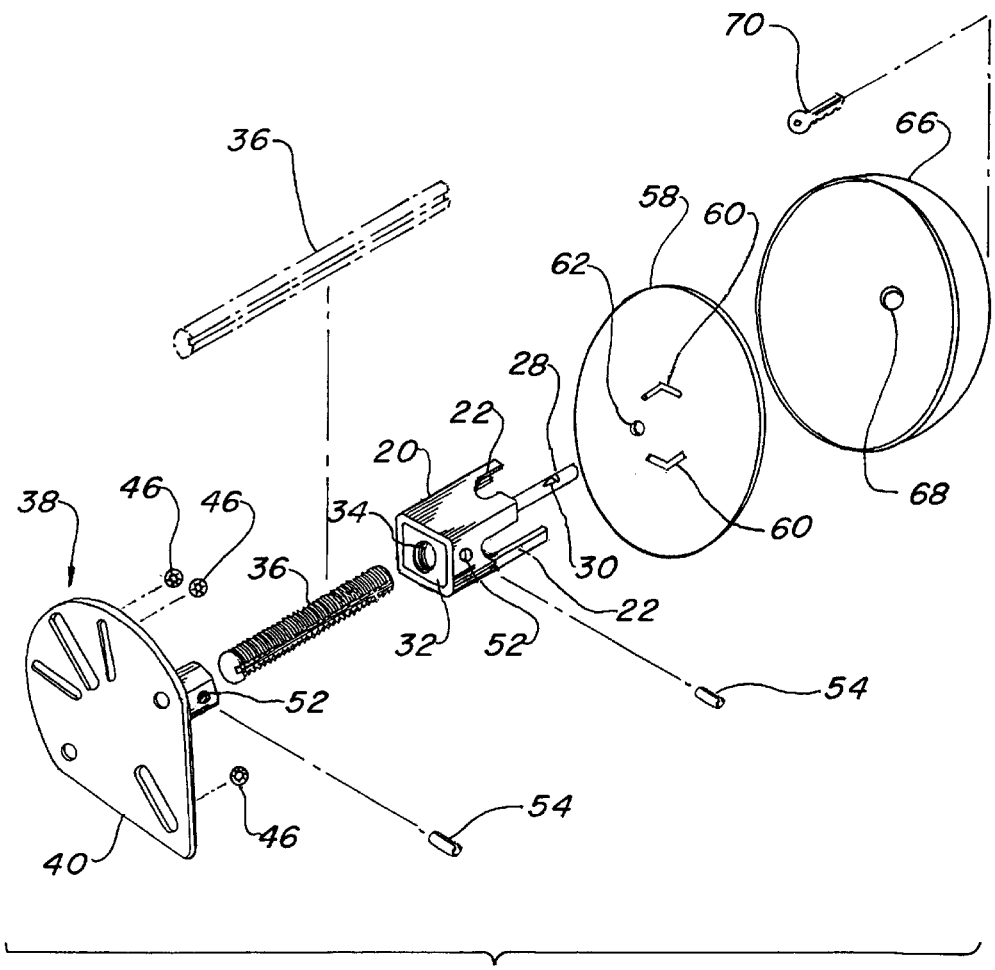
FIG. 13 is an exploded view of the preferred embodiment of invention.

In most cases, a vehicle spare tire bracket or wheel carrier 44 is equipped by the original equipment manufacturer with studs that are aligned to mate with the wheel hub, thus permitting a user to bolt the wheel in place on the bracket with lug nuts in the same manner as on the vehicle. The flat plate 40 of the slotted flange 38 is slotted to match the bolt circle of the vehicle, and since there are many and varied patterns in use, it has been found that four slots and two holes are optimum, as illustrated in FIGS. 5, 6 and 13, and will fit the majority of vehicles on the road today. It should also be noted that a different pattern may be adopted, such as 12 identical slots at equal angular displacement or even slots at varied spacing, and dissimilar alignment will still fall within the scope of this invention.

The slotted flange 38 may be assembled to a vehicle spare tire wheel carrier or bracket 44 by placing the flat plate 40 on the face of the bracket 44 with the studs penetrating through the slots. To hold the flange 38 in place a push nut bolt retainer 46 is urged over the threaded portion of the stud and, as it is thin and does not interfere with the connection, a spare vehicle tire and wheel 48 is then placed upon the studs with the wheel hub 50 contiguously engaging the slotted flange 38. When the lug nuts are tightened against the hub 50, the tire and wheel 48 is securely attached and the flat plate 40 of the slotted flange 38 is tightly sandwiched therebetween.

The slotted flange 38 is adjustably joined to the hollow wrench carrier body 20 with attachment means for connecting to motor vehicles or trailers. The attachment means consist of the round threaded shaft 36 attached to the slotted flange 38 on one end and to the wrench carrier body 20 on the other. Proper adjustment is made by simply rotating the body 20 on the shaft 36. In order to lock the shaft in place once the adjustment is made, a hole 52 is placed through the body 20 halfway through the bottom 32 and also halfway into the threaded boss 42 of the slotted flange 38 penetrating into to the threads at right angles. When the adjustment is made, the grooves in the threaded shaft 36 are aligned with the holes 52, and a tension pin 54 is inserted within each hole 52 and pressed with slip joint pliers in place until the pin engages the bottom of the longitudinal groove, thereby effectively locking the wrench carrier device in place to a motor vehicle or trailer.

In some instances the invention may be initially mounted directly to a wall or bulkhead when only a wheel is to be relocated. To accomplish this utility with wheel relocation, holes may be drilled in the vehicle wall or bulkhead and the slotted flange 38 may be attached with conventional bolts and nuts or self-tapping screws through the existing slots. If only the wrench is to be mounted, an alternate embodiment of the slotted flange 38 would be required.

A four-way lug-wrench 56 is disposed within the open-ended slots 22 in the hollow wrench carrier body 20 after the vehicle tire and wheel 48 has been positioned over the invention, as shown in FIGS. 1–5. The lug-wrench 56 intimately embraces the tire 48 and since the wrench is made of steel and is robust in its design it provides more than adequate strength for protection from unauthorized removal. It should be noted that the wrench 56 may be any type, such as the inch or metric sizing however, it has been found that the ⅝ and ¾ inch diameter has proven to be ideal for the application as it has sufficient length to cover the tire and is completely competent in its structural integrity.

A locking plate 58 is utilized that is round in shape and includes a plurality of apertures 60 and at least one shackle clearance hole 62 that continues therethrough. The locking plate 58 is preferably a round flat sheet metal disc having a peripheral diameter duplicating a vehicle wheel center hub.

A shackle-less padlock 64 is permanently attached unto the locking plate 58, as shown in FIG. 12, and is in alignment with the shackle clearance hole 62. The locking plate apertures 60 slideably align with the long legs 26 of the carrier body 20 and the legs 26 extend completely through, furthermore the shackle lock pin 28 penetrates the padlock. The short legs 24 of the carrier body 20 engage the locking plate underside or are very near, as the locking plate 58 contiguously engages the lug wrench 56. This procedure locks the wrench 56 and spare wheel to the motor vehicle or trailer when the slotted flange is connected to a spare tire carrier, a vehicle wall or trailer bulkhead, thus preventing unauthorized removal of both the lug-wrench or spare tire and wheel.

It should be noted that the padlock 64 may be of any type, however a laminated steel padlock with a removable shackle is ideal, or a conventional lock may be altered slightly to remove the U-shaped shackle. A shackle-less padlock 64 that is manufactured without any shackle is also a viable alternative.

For cosmetic purposes and to protect the lock, a optional baby moon hub cap 66 may be snapped onto an upset portion of the peripheral diameter of the locking plate 58 for concealing and protecting the padlock from prevailing environmental elements. The baby moon hub cap 66 requires a clearance keyhole 68 in alignment with the keyhole of the lock 64 configured with sufficient clearance to permit a key 70 to enter and rotate.

During use, the invention is attached to the wheel carrier of the vehicle or trailer and the spare wheel is placed over the carrier and held in place with the vehicle's lug nuts. A four-way lug-wrench 56 is inserted in the open-ended slots 22 of the body 20 with at least two ends of the wrench resting against the tire of the spare wheel. The locking plate 58 is then placed over the shackle lock pin 28, with the long legs 26 of the body 20 penetrating the apertures 60 interfacing with the body and captivating the lug-wrench 56 within the slots 22 to securely hold the wrench in place. For removal, the key 70 is inserted through the clearance keyhole 68 in the baby moon hub cap 66, into the padlock 64 and the locking plate 58 with its integral lock is separated from the body 20 exposing the wrench 56.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms, which may come within the language and scope of the appended claims.

What is claimed is:

1. A lug wrench and spare tire locking assembly mountably attached to a motor vehicle or trailer for securing a four-way lug-wrench and a spare tire and wheel comprising:
   a hollow wrench carrier body having four open-ended slots at right angles to each other configured to interface with a four-way lug-wrench, said body having a first pair of opposed short legs formed between two adjacent open ended slots, and a second pair of opposed long legs formed between each remaining opposed open ended slots,
   at least one shackle connected within the hollow of the wrench carrier body contiguously engaging at least one of the short legs, with the shackle extending beyond the body,
   a slotted flange adjustably joined to the hollow wrench carrier body with attachment means for connection to motor vehicles or trailers,
   a four-way lug-wrench disposed within the open-ended slots of the hollow wrench carrier body, and
   a locking plate having a plurality of apertures and at least one shackle clearance hole therethrough, also a shackle-less padlock permanently attached thereunto in alignment with the shackle clearance hole, said locking plate apertures slideably align upon the extending long legs of the carrier body, the shackle penetrates the padlock and the short legs of the carrier body engage the locking plate underside for attachment thereof; subsequently, the locking plate contiguously engages the lug wrench, locking the wrench and spare wheel to a motor vehicle or trailer when the slotted flange is connected to a spare tire bracket, a vehicle wall or trailer bulkhead, thus preventing unauthorized removal of both the wrench and spare tire and wheel.

2. The assembly as recited in claim 1 wherein said hollow wrench carrier body is rectangular in shape and formed of metal and both the short legs and the long legs are angularly shaped.

3. The assembly as recited in claim 2 wherein said shackle is a single separate lock pin positioned within a corner of the hollow rectangular wrench carrier body.

4. The assembly as recited in claim 1 wherein said attachment means for connection to motor vehicles or trailers further comprising,
   said carrier body having a threaded bore within the body that is parallel to the shackle,
   said slotted flange having a female threaded boss attached thereunto, and
   a round threaded shaft connected to the bore of the body and the threaded boss, thereby providing linear adjustment relative to a tire width and depth when the flange is fastened to a vehicle or trailer tire carrier.

5. The assembly as recited in claim 4 wherein said round threaded shaft further having a longitudinal groove therein for locking the shaft in place when adjusted relative to a tire width and depth.

6. The assembly as recited in claim 5 wherein said wrench carrier body and the slotted flange having a female threaded boss attached thereunto, each further having a hole into the respective threaded bore and threaded boss at right angles to the threads, and a tension pin disposed within each hole contiguously engaging the longitudinal groove in the shaft for retainment of the wrench carrier body to a motor vehicle or trailer.

7. The assembly as recited in claim 4 wherein said slotted flange further comprising a flat metallic plate with half in a semi-circular shape and half in an angular shape, with the female threaded boss essentially located halfway in between.

8. The assembly as recited in claim 7 wherein said slotted flange further having a plurality of slots configured to mate with a vehicle or trailer spare tire bracket.

9. The assembly as recited in claim 1 wherein said four way lug wrench is the ⅝-inch diameter type.

10. The assembly as recited in claim 1 wherein said four way lug wrench is the ¾ inch diameter type.

11. The assembly as recited in claim 1 wherein said locking plate further comprising a round flat sheet metal disc.

12. The assembly as recited in claim 11 wherein said round flat sheet metal disc is configured having a peripheral diameter duplicating a vehicle wheel center hub.

13. The assembly as recited in claim 12 further comprising a moon hub cap snapped onto the peripheral diameter of the locking plate for concealing and protecting the padlock from prevailing environmental elements.

14. A lug wrench and spare tire locking assembly attached to a motor vehicle or trailer for securing a four-way lug-wrench and a spare tire and wheel, comprising:
   a wrench carrier body having open ended slots at right angles to each other configured to interface with a four-way lug- wrench, said body having a first pair of opposed short legs formed between two adjacent open-ended slots, and a second pair of opposed long legs formed between each remaining opposed open-ended slot,
   a shackle connected within the wrench carrier body engaging the short legs, with the shackle extending above the body,
   a slotted flange adjustably joined to the wrench carrier body for connection to motor vehicles or trailers,
   a four-way lug-wrench disposed within the open ended slots of the wrench carrier body,
   a locking plate having apertures and a shackle clearance hole therethrough, engaging the short legs and slideably aligned onto the extending long legs and shackle, and
   a padlock disposed upon the extending shackle engaging the locking plate, which hold the wrench to a spare wheel of a motor vehicle or trailer when the slotted flange is connected to a spare tire carrier, thus preventing unauthorized removal of both the wrench and spare tire and wheel.

15. A lug wrench and spare tire locking assembly attached to a motor vehicle or trailer for securing a four-way lug-wrench and a spare tire and wheel, comprising:
   a lug-wrench carrier body having a plurality of open-ended slots with a first pair short legs formed between two slots, and a second pair of long legs formed between remaining slots,
   a shackle connected to the body short legs, extending above the body,
   a slotted flange joined to the body for connection to motor vehicles or trailers,
   a four-way lug-wrench disposed within the slots of the body,
   a locking plate having apertures and a shackle clearance hole therethrough, engaging the short legs and slideably aligned onto the long legs and shackle, and
   a padlock disposed upon the extending shackle engaging the locking plate to prevent unauthorized removal of both the lug-wrench and spare tire and wheel.

* * * * *